United States Patent [19]
Pund

[11] Patent Number: 5,592,285
[45] Date of Patent: Jan. 7, 1997

[54] OPTICAL SOURCE POSITION AND DIRECTION SENSOR

[76] Inventor: Marvin L. Pund, 14529 Amstell Ct., Chesterfield, Mo. 63017

[21] Appl. No.: 571,084

[22] Filed: Dec. 12, 1995

[51] Int. Cl.$^6$ .................................................. G01B 11/00
[52] U.S. Cl. ............................ 356/121; 356/375; 356/400
[58] Field of Search ..................................... 356/121, 375, 356/400

[56] References Cited

U.S. PATENT DOCUMENTS

| 4,037,959 | 7/1977 | Bumgardner | 356/73 |
| 4,786,178 | 11/1988 | Teach | 356/400 |
| 4,964,735 | 10/1990 | Sasnett et al. | 356/121 |

OTHER PUBLICATIONS

Melles Griot, Optical Beam Position Measurement System, 2152 May 1992, p. 2.

*Primary Examiner*—F. L. Evans

[57] ABSTRACT

A sensor for determining the lateral position and direction of an optical source having an arbitrary spatial intensity distribution. The sensor includes two substantially separated apertures which establish the extent of an optical radiation ray bundle which includes rays from the optical source. The power centroid of this optical radiation ray bundle is measured in the plane of the first aperture and in the plane of the second aperture. Optical source position and direction are computed from these two measurements.

9 Claims, 3 Drawing Sheets

OPTICAL SOURCE POSITION AND DIRECTION SENSOR

FIELD OF INVENTION

This invention relates to optical alignment instruments used to measure the orientation in lateral position and direction of an optical radiation source. Here an optical radiation source reform to any object that emits or reflects, or any group of objects that emit or reflect, radiant energy in the optical wavelength spectrum from deep ultraviolet wavelengths to long wavelength infrared wavelengths. While the invention is described in particular detail with respect to optical alignment applications, those skilled in the an will recognize the wider applicability of the inventive principles disclosed hereinafter. In particular this invention has application wherever the measurement of the relative positions and directions of two objects, one including an optical radiation source and the other a lateral position and direction sensor is useful or desirable.

DISCUSSION OF PRIOR ART

Optical radiation sources, including incandescent lamps, light emitting diodes (LED's) and lasers are widely used as components in optical systems. Such optical radiation sources are also widely used as temporary alignment aids for the alignment of optical elements and systems. Optical radiation sources are also used in other applications to indicate the lateral position orientation, deflection and motion of mechanical systems.

In many applications the image of an optical radiation source is formed on a position sensitive detector by a collection optical system. Here a position sensitive detector refers to any of a range of photosensitive sensor types including, photo diode quadrant detectors, scanned linear photo diode arrays and charge coupled devices (CCD's), two dimensional CCD's, lateral effect photo diode sensors, vidicons and other image forming sensors. The position sensitive detector senses either the lateral position or the direction of the source with respect to the sensor.

Optical radiation sources can be divided into three types when described with respect to the angular and lateral distributions of emitted or reflected energy. The first type of source is a narrowly restricted and highly directional source such as a gaussian helium neon (HeNe) laser beam. The second is a non-directional source such as an incandescent filament. The third is a source with a broad and non-uniform directional characteristic such as a light emitting diode, laser diode or focused incandescent lamp.

Numerous types of instruments have been developed to measure lateral position and/or direction of particular types of optical radiation sources. However, no prior instrument has been described that can simultaneously measure the lateral position and direction of highly directional, non-uniform and non-directional optical radiation sources over a range of distances from the measurement instrument. U.S. Pat. No. 4,786,178 to Teach (1988) describes a system that simultaneously measures the position and orientation of a laser beam. Melles Griot product brochure 2152 5/92 titled Optical Beam Position Measurement System illustrates a technique to monitor laser power, centration and alignment. However, neither system is suitable for simultaneous measurement of lateral position and direction of non-uniform or non-directional optical radiation sources.

There are numerous camera systems used for optical radiation source lateral position or direction measurements. These systems generally consist of an entrance aperture, lens assembly, and position sensitive detector. A camera with a lens having its back focal point at the position sensitive detector can measure the direction of any source positioned in the far field that illuminates the lens aperture. Such a camera can be used to measure the lateral position of a source that uniformly illuminates the lens aperture and is at a known distance from the aperture. When the optical radiation source is moved closer to the aperture the lens will form an image of the optical radiation source behind the position sensitive detector sun:ace. In this condition an accurate measurement is possible only if the centroid of the radiation entering the aperture passes through the center of the entrance aperture. If a collimated source like a helium neon (HeNe) laser source or a non-uniform directional source such as an LED is directed at the camera aperture from a point a short distance in front of the aperture the direction measured for this optical radiation source will change as a function of the position of the beam power centroid with respect to the aperture center.

Another common configuration of equipment for gaussian beam position sensing uses a position sensitive detector exposed directly to the laser beam. This type of system is sensitive to errors due to background radiation such as room lights.

OBJECTS AND ADVANTAGES

One of the principal objects of the present invention is to provide a sensor that can simultaneously measure the lateral position and direction of an optical radiation source at any distance from the sensor. Herein the term sensor refers to an instrument that includes means to collect optical radiation from an optical radiation source, measure the characteristics of the collected radiation, compute results based upon the measured results, and present the results at an output device. Another object of the present invention is to provide a sensor that can simultaneously measure and display the lateral positions of the power centroids of a ray bundle entering the sensor at any two distances from the sensor. Another object is to provide a sensor that can simultaneously measure the lateral position and direction of an optical radiation source having any arbitrary angular radiation characteristic, provided that the source directs some optical radiation through any part of the entrance apertures of the sensor. Herein the term ray bundle refers to the total angular and lateral extent of all optical rays that pass through the apertures of the sensor. Herein power centroid refers to the weighted average position of the optical power within a ray bundle measured at a specified distance from the sensor.

Another object of the invention is to provide a sensor that is relatively insensitive to radiation from optical radiation sources that are positioned outside of the ray bundle accepted by the sensor. Thus the sensor can be used to measure the lateral position and direction of radiation sources with normal room lights turned on. Still another object of the invention is to measure the total power of the radiation passing through the sensor apertures.

Further objects and advantages of this invention will become apparent from a consideration of the drawings and ensuing description.

DETAILED DESCRIPTION OF INVENTION

Figure 1:
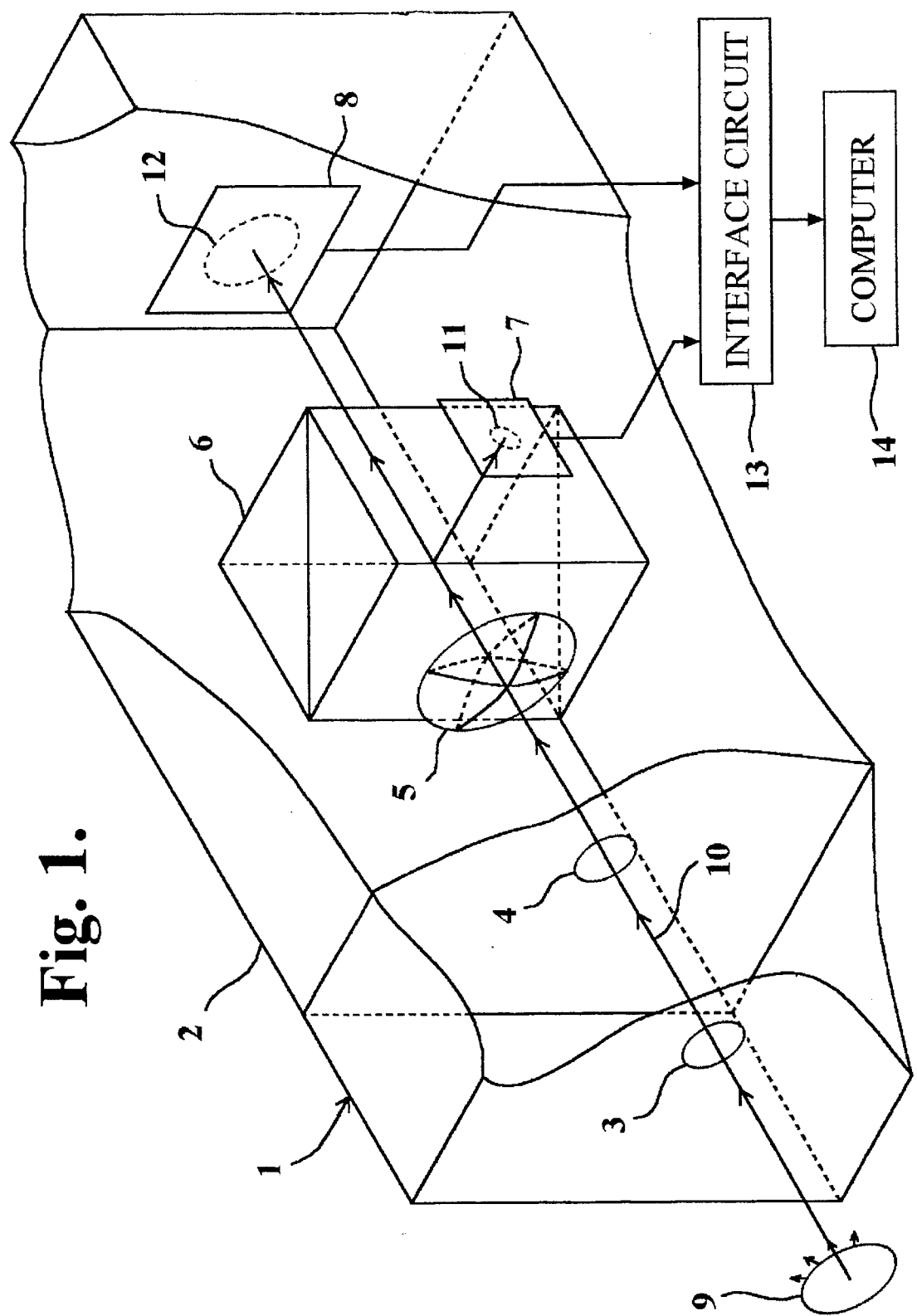
FIG. 1. is a perspective view of a basic version of the invention.

Reviewing now to FIG. 1, reference numeral 1 indicates one illustrative embodiment of a sensor head of this invention. Sensor head 1 includes an enclosure 2 shown in a cut away view, a first aperture 3 positioned in the front surface of enclosure 2, a second aperture 4, a relay lens 5, a beamsplitter 6, a first position sensitive detector 7, and a second position sensitive detector 8. FIG. 1 further shows an optical radiation source 9, a sensor head optical axis 10, a first aperture image 11, a second aperture image 12, an interface circuit 13, and a computer 14.

First aperture 3 is the only opening in enclosure 2 through which optical radiation can enter sensor head 1. Herein, aperture refers to an optically transparent opening with an optically opaque surrounding area. Sensor head optical axis 10 is defined as a vector normal to the front surface of enclosure 2 with its origin at the center of first aperture 3. Second aperture 4 is positioned with its center on sensor head optical axis 10 but positioned a substantial distance away from first aperture 3. First aperture 3 and second aperture 4 together define a ray bundle which is the total angular and lateral extent of all optical rays that strike relay lens 5. Optical radiation source 9 is an extended source of optical radiation. All of the optical rays in the ray bundle that strike relay lens 5 are radiated or reflected from optical radiation source 9. Optical radiation source 9 may have any spatial or angular distribution of optical radiation. It may include one or more areas of highly intense radiation surrounded by background areas having low optical intensity. An optical radiation ray bundle is herein defined as the angular and lateral distribution of optical radiation intensity produced by optical radiation source 9 across the full angular and lateral extent of the ray bundle.

Relay lens 5 is a positive lens which forms first aperture image 11. First aperture image 11 is a real image of the optical radiation ray bundle in the optical plane of first aperture 3. Relay lens 5 also forms second aperture image 12. Second aperture image 12 is a real image of the optical radiation ray bundle in the optical plane of second aperture 4. The aperture of relay lens 5 is large enough to pass the entire ray bundle. Beamsplitter 6 divides the ray bundle into two nearly equal parts. Beamsplitter 6 is spectrally neutral, polarization insensitive, and maintains an equal split of the radiation across the angular and spatial extent of the ray bundle. The aperture of beamsplitter 6 is large enough to reflect and pass the entire ray bundle.

First position sensitive detector 7 is centered coincident with first aperture image 11. First position sensitive detector 7 is large enough so that all of the optical radiation forming first aperture image 11 strikes the photosensitive area of first position sensitive detector 7. Second position sensitive detector 8 is centered coincident with second aperture image 12. Second position sensitive detector 8 is large enough so that all of the optical radiation forming second aperture image 12 strikes the photosensitive area of second position sensitive detector 8.

Interface circuit 13 amplifies, conditions and digitizes the electrical signals from position sensitive detector 7 and position sensitive detector 8. The digitized signals from interface circuit 13 are made available to computer 14 for digital processing. Position sensitive detector 7 and position sensitive detector 8 may be two dimensional lateral effect photo diode position sensitive detectors such as the model S2044 Pin-Cushion Type made by Hamamatsu Photonics K. K. It will be apparent to those skilled in the an that other types of position sensitive detectors can be substituted with appropriate changes to interface circuit 13. Such substitutions may be used to change the spectral sensitivity range of sensor head 1 or other characteristics. IF position sensitive detector 7 and position sensitive detector 8 are S2044 detectors then interface circuit 13 will contain eight amplifier channels. Each S2044 detector generates 4 output signals that vary based upon the position and intensity of optical radiation striking the detector. Each amplifier channel amplifies one electrical output signal. Interface circuit 13 also contains an analog to digital converter that converts each of the eight amplifier output signals from analog voltage levels to digital representations that are suitable for computer processing analog to digital converter may be a model CIO - DAS08 general purpose analog to digital converter made by Computer Boards, Inc. or a similar system. Computer 14 may be an IBM PC TM compatible personal computer or similar system. Computer 14 includes a processing unit, keyboard input, display monitor, data storage disk, data output port, and a control and data processing program. The CIO-DAS08 can be installed into an XT type expansion slot in an IBM PC TM compatible personal computer.

The eight digitized outputs may be used to compute the centroid positions of the optical radiation ray bundle striking first position sensitive detector 7 and second position sensitive detector 8. A standard processing technique provided by the detector manufacturer is used to compute radiation centroid positions. First aperture image 11 is a real image of a first aperture object. Herein first aperture object is defined as the optical power distribution of the optical radiation ray bundle in the plane of first aperture 3. The radiation centroid position computed for first position sensitive detector 7 corresponds to the lateral power centroid position of the optical radiation ray bundle at first aperture 3. Similarly, second aperture image 12 is a real image of a second aperture object. Herein, second aperture object is defined as the optical power distribution of the optical radiation ray bundle in the plane of second aperture 4. The radiation centroid position computed for second position sensitive detector 8 corresponds to the lateral power centroid position of the optical radiation ray bundle at second aperture 4.

The lateral position of the optical radiation ray bundle power centroid can be computed at any distance measured along optical axis 10 from first aperture 3. The power centroid position at first aperture 3 can be defined as position (X3, Y3, Z3) with X3 and Y3 defined as lateral offsets from the optical axis and Z3 as the position along the optical axis at first aperture 3. Similarly the prover centroid position at second aperture 4 can be defined as position (X4, Y4, Z4). The power centroid position X, Y at any other Z position along the optical axis can be computed using the following equations:

$$X = X3 + Z * (X4 - X3)/(Z4 - Z3);$$

$$Y = Y3 + Z * (Y4 - Y3)/(Z4 - Z3);$$

The direction of propagation of the optical radiation ray bundle power centroid can also be computed. The angle between the direction of propagation and the optical axis, measured in the X-Z plane, can be defined as AngXZ, and in the Y-Z plane as AngYZ. The angles AngXZ and AngYZ can be computed using the following equations:

$$AngXZ = \arctan((X4-X3)/(Z4-Z3));$$

$$AngYZ = \arctan((Y4-Y3)/(Z4-Z3));$$

As defined earlier, optical radiation source 9 may have any spatial or angular distribution of optical radiation. It may include one or more areas of highly intense radiation surrounded by background areas having low optical intensity. In order to measure the lateral position and direction of a single source of radiation such as an incandescent filament, LED or laser beam within optical radiation source 9 the following procedure can be used. First, the source to be measured can be turned off Second the sensor can measure the output signals from the four channels of position sensitive detector 7 and the output signals from the four channels of position sensitive detector 8. These output signals represent background optical radiation. Third, the source to be measured can be turned on. Fourth, the sensor can measure the output signals from the four channels of position sensitive detector 7 and the output signals from the four channels of position sensitive detector 8. These output signals represent the combination of the source optical radiation plus background optical radiation. Fifth, the eight output signals which represent background optical radiation only can be subtracted from the corresponding eight output signals that represent source optical radiation plus background optical radiation. Last, the difference signals can be processed by computer 14 using the equations described previously to compute the X, Y, AngXZ and AngYZ values. If the areas of background radiation produce negligibly small signals the lateral position and direction of a single bright source can be measured directly without the need for the subtraction of background measurements.

First aperture image 11 and second aperture image 12 may not be exact reproductions of the optical radiation ray bundle at first aperture 3 and second aperture 4. First aperture image 11 and second aperture image 12 may contain optical aberrations such as spherical aberration, astigmatism, coma, chromatic aberration and distortion caused by relay lens 5 and beamsplitter 6. Minor shifts in power centroid measurement positions may occur due to these aberrations. These aberrations can be characterized for any optical path through relay lens 5 and beamsplitter 6 based upon the detailed design characteristics of relay lens 5 and beamsplitter 6. The optical path of the optical radiation ray bundle power centriod can be determined at each optical surface using X, Y, AngXZ, and AngYZ computations above and the design characteristics of the optical system. Corrections to the power centroid positions can then be computed based upon the effect of the aberrations.

Position sensitive detector 7 and position sensitive detector 8 may contain non linear measurement characteristics. The magnitudes of non linear characteristics can be characterized by directing a beam of optical radiation directly onto position sensitive detector 7 and position sensitive detector 8 in a precise pattern of points. The differences between the power centroids measured by position sensitive detector 7 and position sensitive detector 8 and the power centroids of the mechanically established patterns can be used as correction factors to compensate for any non linear characteristics.

The sensitivity of the sensor to a source of monochromatic optical radiation can be determined. First, the total optical power within the optical radiation ray bundle can be measured using a calibrated power meter positioned directly behind second aperture 4. Second, the meter can be removed. Using the same monochromatic source, the output signals from each of the four outputs from position sensitive detector 7 and the four outputs from position sensitive detector 8 can be measured and stored. The sensitivity at the selected wavelength for position sensitive detector 7 is then equal to the sum of its four outputs divided by the power measured using the calibrated power meter. The sensitivity for position sensitive detector 8 is computed in the same way using the sum of its four outputs.

Figure 2:
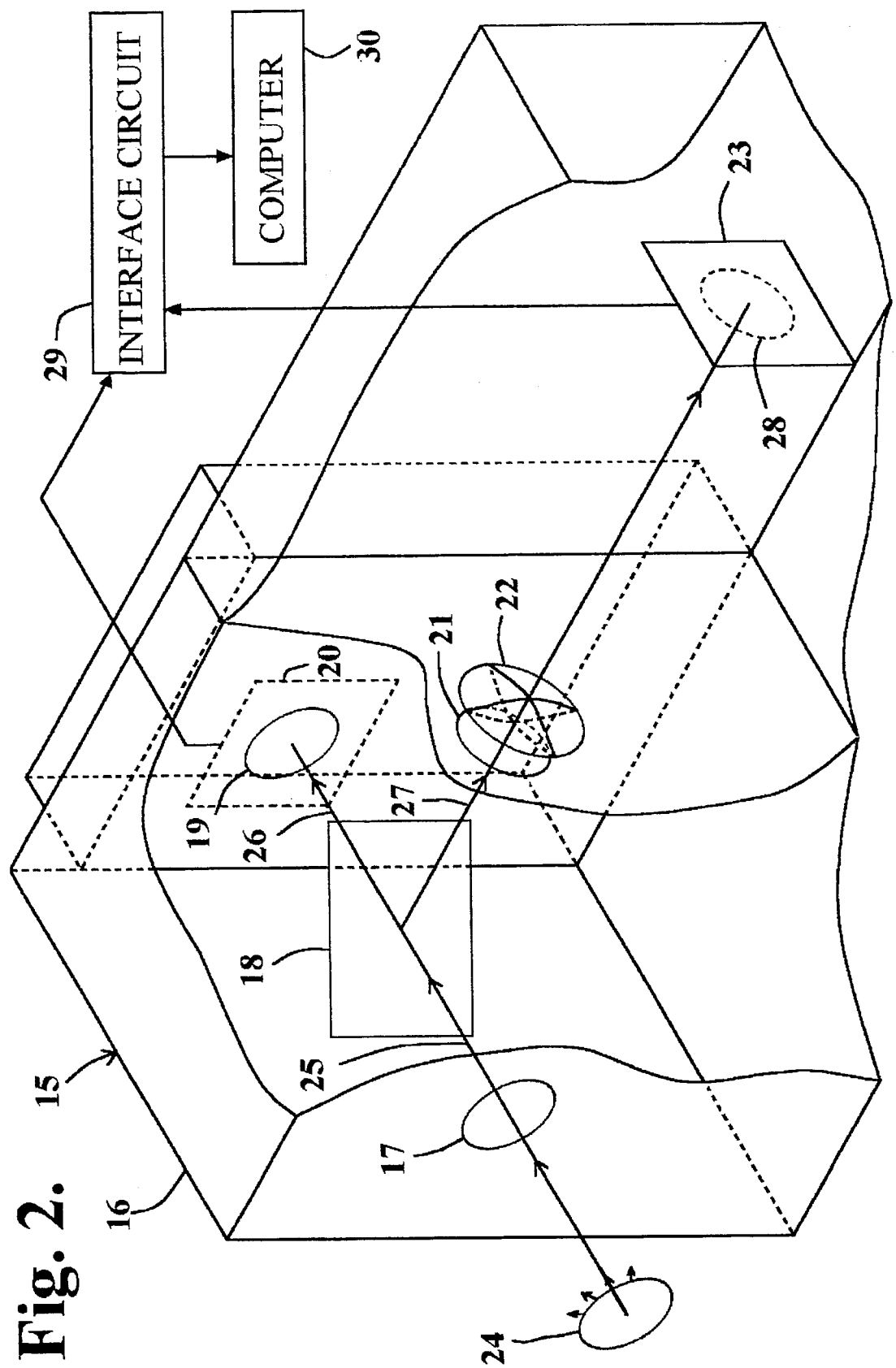
FIG. 2. is a perspective view of a second embodiment of the invention.

FIG. 2, reference numeral 15 indicates a second illustrative embodiment of a sensor head of this invention. The sensor head 15 includes an enclosure 16 show n in a cut away view, a first aperture 17 positioned in the front surface of enclosure 16, a beamsplitter 18, a second aperture 19, a first position sensitive detector 20, a third aperture 21, a relay lens 22, and a second position sensitive detector 23. FIG. 2 further shows an optical radiation source 24, a sensor head optical axis 25, a transmitted optical axis 26, a reflected optical axis 27, a first aperture image 28, an interface circuit 29 and a computer 30.

Sensor head 15 shown in FIG. 2 differs from the embodiment of FIG. 1 is several respects. Optical radiation from an optical radiation source 24 enters the sensor head 15 through first aperture 17. Beamsplitter 18 divides the optical radiation that strikes it from optical radiation source 24 into two nearly equal pans. The aperture of beamsplitter 18 is large enough to pass all of the rays of optical radiation that pass directly through first aperture 17 and second aperture 19. Second aperture 19 and third aperture 21 are positioned at equal optical distances from beamsplitter 18 along the transmitted optical axis 26 and reflected optical axis 27 respectively. Second aperture 19 is positioned a substantial distance away from first aperture 17. Second aperture 19 and third aperture 21 are the same size. The optical radiation ray bundle passing through second aperture 19 is the same as the optical radiation ray bundle passing through third aperture 21. Position sensitive detector 20 is positioned with its photosensitive surface in contact with the rear surface of second aperture 19. Relay lens 22 is a positive lens which forms a first aperture image 28. First aperture image 28 is a real image of the optical radiation ray bundle in the plane of first aperture 17.

Position sensitive detector 20 directly measures the optical radiation ray bundle power centroid at second aperture 19. This differs from the embodiment of FIG. 1 wherein position sensitive detector 8 measures the power centroid of the real image of the optical radiation ray bundle in the plane of second aperture 4. The power centroid of second aperture image 12 of FIG. 1. is inverted with respect to the orientation of the power centroid on position sensitive detector 20. This must be taken into account in the signal processing or calculations in the interface circuit 29 or computer 30.

Figure 3:
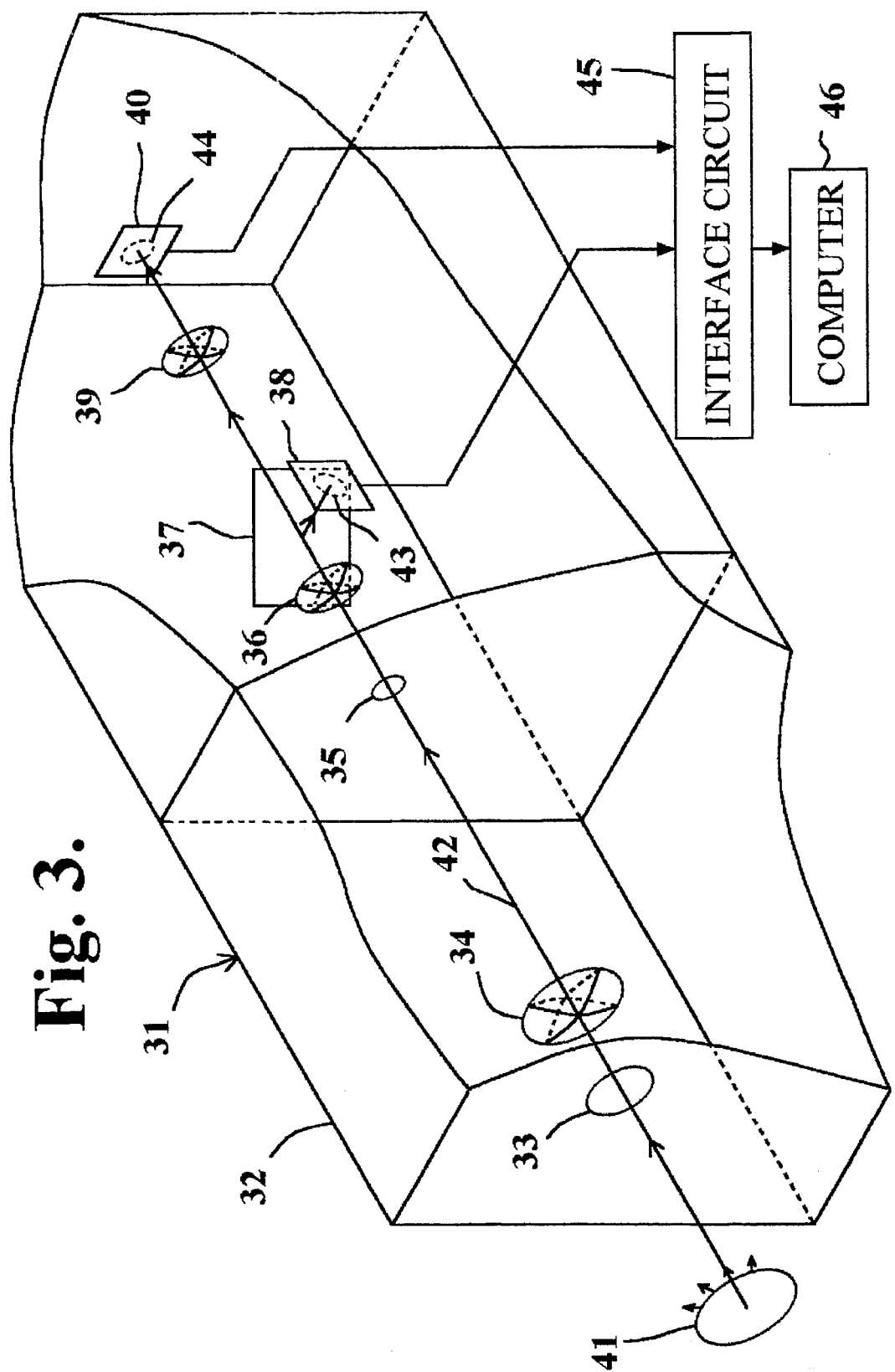
FIG. 3. is a perspective view of a third, preferred, embodiment of the invention.

FIG. 3. reference numeral 31 indicates a third preferred embodiment of a sensor head of this invention. Sensor head 31 includes an enclosure 32 shown in a cut away view, a first aperture 33 positioned in the front surface of enclosure 32, an objective lens 34, a second aperture 35, a first relay lens 36, a beamsplitter 37, a first position sensitive detector 38, a second relay lens 39, and a second position sensitive detector 40. FIG. 3 further shows an optical radiation source 41, a sensor head optical axis 42, a first aperture image 43, a second aperture image 44, an interlace circuit 45, and a computer 46.

Sensor head 31 shown in FIG. 3 differs from the embodiments of FIG. 1 and FIG. 2 is several respects. Objective lens 34 is positioned behind first aperture 33. Objective lens 34 is a positive lens that is large enough so that its aperture is not a limiting aperture for the sensor optics path. Second aperture 35 is positioned at the rear focal point of objective lens 34. In this position it forms a field stop defining the angular field of the sensor in the far field. A first relay lens 30 is positioned with its front focal point at aperture 35. The aperture of relay lens 35 is large enough to pass the entire optical radiation ray bundle. Objective lens 34 and first relay lens 36 together from first aperture image 43, which is a real image of the optical radiation ray bundle in the plane of first aperture 33. Position sensitive detector 38 is centered coincident with first aperture image 43.

Second relay lens 39 is positioned behind beamsplitter 37. First relay lens 36 and second relay lens 39 together form second aperture image 44, which is a real image of the optical radiation ray bundle in the plane of second aperture 35. Position sensitive detector 40 is centered coincident with second aperture image 44.

A difference in the embodiment of FIG. 3 as compared to of FIG. 1 and FIG. 2 is that an image of the far field is formed at second aperture 35. This effectively separates the two apertures by a long distance. The wider separation provides for greater accuracy in the determination of position and direction as compared to two apertures that are more closely spaced along the optical axis. The function of the interface circuit 45 and computer 46 are similar to that described for the embodiments of FIG 1 and FIG. 2.

Numerous variations, within the scope of the appended claims, will be apparent to those skilled in the art in view of the foregoing description and accompanying drawings. While certain of the elements of the optics are described as lenses, it will be appreciated that the lenses may comprise any of a variety of focusing elements. While the invention has been described with respect to optical alignment instruments those skilled in the art will recognize that the invention has a variety of applications, including the determination of the relative position and orientation of any two mechanical structures upon which one has mounted a reference optical radiation source and upon which the second has mounted the sensor head.

What is claimed is:

1. A sensor for determining the lateral position and direction of the power centroid of an optical radiation ray bundle comprising:

means for defining said optical radiation ray bundle, including a first aperture and a second aperture substantially separated from said first aperture;

means for performing a first power centroid measurement of said optical radiation ray bundle at a first aperture object and for performing a second power centroid measurement of said optical radiation ray bundle at a second aperture object;

means for computing, from said first power centroid measurement and said second power centroid measurement, the direction and lateral position of the power centroid of said optical radiation ray bundle in any object plane.

2. The sensor of claim 1 further comprising a single, intense optical radiation source positioned within said optical radiation ray bundle.

3. The sensor of claim 2 wherein the optical radiation source is a helium neon laser that emits a gaussian shaped laser beam.

4. The sensor of claim 2 wherein the optical radiation source is a non- directional incandescent filament radiation source.

5. The sensor of claim 2 wherein the optical radiation source is a non-uniformly directional light emitting diode radiation source.

6. The sensor of claim 1 wherein the means for defining said optical radiation ray bundle includes means for forming an image of the far field optical radiation intensity pattern at said second aperture.

7. A method for determining the lateral position of the power centroid of an optical radiation source comprising the steps of:

establishing an optical radiation ray bundle that includes radiation from said optical radiation source and that is confined be a first aperture and a second aperture substantially separated from said first aperture;

measuring the distance from said first aperture to said optical radiation source;

measuring a first power centroid of said optical radiation ray bundle in the plane of said first aperture;

measuring a second power centroid of said optical radiation ray bundle in the plane of said second aperture;

computing said lateral position based upon the distance measurement, the first power centroid measurement, and the second power centroid measurement.

8. The method of claim 7 further comprising the steps of:

dividing the optical radiation source into a single small source of intense optical radiation and a widely distributed source of background radiation;

turning off said single small source of intense optical radiation;

measuring a first background power centroid of the background portion of said optical radiation ray bundle in the plane of said first aperture;

measuring a second background power centroid of the background portion of said optical radiation ray bundle in the plane of said second aperture;

computing a first power centroid and a second power centroid of the single small source of intense optical radiation by subtracting the contributions of the first background power centroid from the first power centroid of the combined ray bundle, and by subtracting the contributions of the second background power centroid from the second power centroid of the combined ray bundle.

9. A method for determining the direction of propogation of the power centroid of an optical radiation source comprising the steps of:

establishing an optical radiation ray bundle that includes radiation from said optical radiation source and that is confined by a first aperture and a second aperture substantially separated from said first aperture;

measuring a first power centroid of said optical radiation ray bundle in the plane of said first aperture;

measuring a second power centroid of said optical radiation ray bundle in the plane of said second aperture;

computing said direction of propogation based upon the first power centroid measurement, the second power centroid measurement, and the known optical spacing between said first aperture and said second aperture.

* * * * *